United States Patent [19]
Devier et al.

[11] Patent Number: 5,182,908
[45] Date of Patent: Feb. 2, 1993

[54] CONTROL SYSTEM FOR INTEGRATING A WORK ATTACHMENT TO A WORK VEHICLE

[75] Inventors: Lonnie J. Devier; John J. Krone, both of Dunlap; Stephen V. Lunzman, Chillicothe; Howard A. Marsden, Pekin, all of Ill.

[73] Assignee: Caterpillar Inc., Peoria, Ill.

[21] Appl. No.: 819,705

[22] Filed: Jan. 13, 1992

[51] Int. Cl.⁵ .............................................. F16D 31/02
[52] U.S. Cl. ....................................... 60/420; 60/459; 91/518; 91/532
[58] Field of Search ................. 91/514, 516, 517, 518, 91/532, 459; 60/420, 459, 428, 420, 430, 422

[56] References Cited

U.S. PATENT DOCUMENTS

| | | | |
|---|---|---|---|
| 3,821,625 | 6/1974 | Scholl | 318/624 |
| 4,354,420 | 10/1982 | Bianchetta | 60/421 X |
| 4,523,892 | 6/1985 | Mitchell et al. | 417/34 |
| 4,534,707 | 8/1985 | Mitchell | 417/34 |
| 4,586,330 | 5/1986 | Watanabe et al. | 60/421 |
| 4,712,376 | 12/1987 | Handank | 60/427 |
| 4,718,329 | 1/1988 | Nakajima et al. | 91/445 |
| 4,745,744 | 5/1988 | Cherry et al. | 60/420 X |
| 4,884,402 | 12/1989 | Strezice et al. | 91/459 X |
| 5,029,067 | 7/1991 | Nishida et al. | 60/421 X |
| 5,074,373 | 12/1991 | Schmidt | 180/305 |

FOREIGN PATENT DOCUMENTS

0235545B1 9/1990 European Pat. Off. .

OTHER PUBLICATIONS

Application No. 07/817,569, filed Jan. 7, 1992, Title: Hydraulic Control Apparatus, Attorney Docket No.: 91-318.

Primary Examiner—Edward K. Look
Assistant Examiner—Hoang Nguyen
Attorney, Agent, or Firm—David M. Masterson

[57] ABSTRACT

An apparatus controls a fluid system of a work vehicle. The work vehicle has an engine and at least one fluid circuit which has a pump driven by the engine. A plurality of control valves controllably pass fluid from the pump to a plurality of respective work elements. The control valves have movable valve stems. A work attachment which has a respective control valve is added to the fluid system. A plurality of operator control elements provide demand signals in response to selected settings. Each demand signal is indicative of a requested fluid flow to a respective work element or work attachment. A memory device stores select parameters of the fluid system. One of the select parameters is a predetermined priority value representing the precedence in which fluid is delivered from the pump to the control valve of the work attachment. A controller receives the predetermined priority value of the work attachment and the demand signals. The controller responsively determines the sequence in which fluid is distributed from the pump to the respective control valves. Then the controller delivers control signals to the rerspective control valves in response to the determination, selectively positioning the stem of the respective control valves.

12 Claims, 2 Drawing Sheets

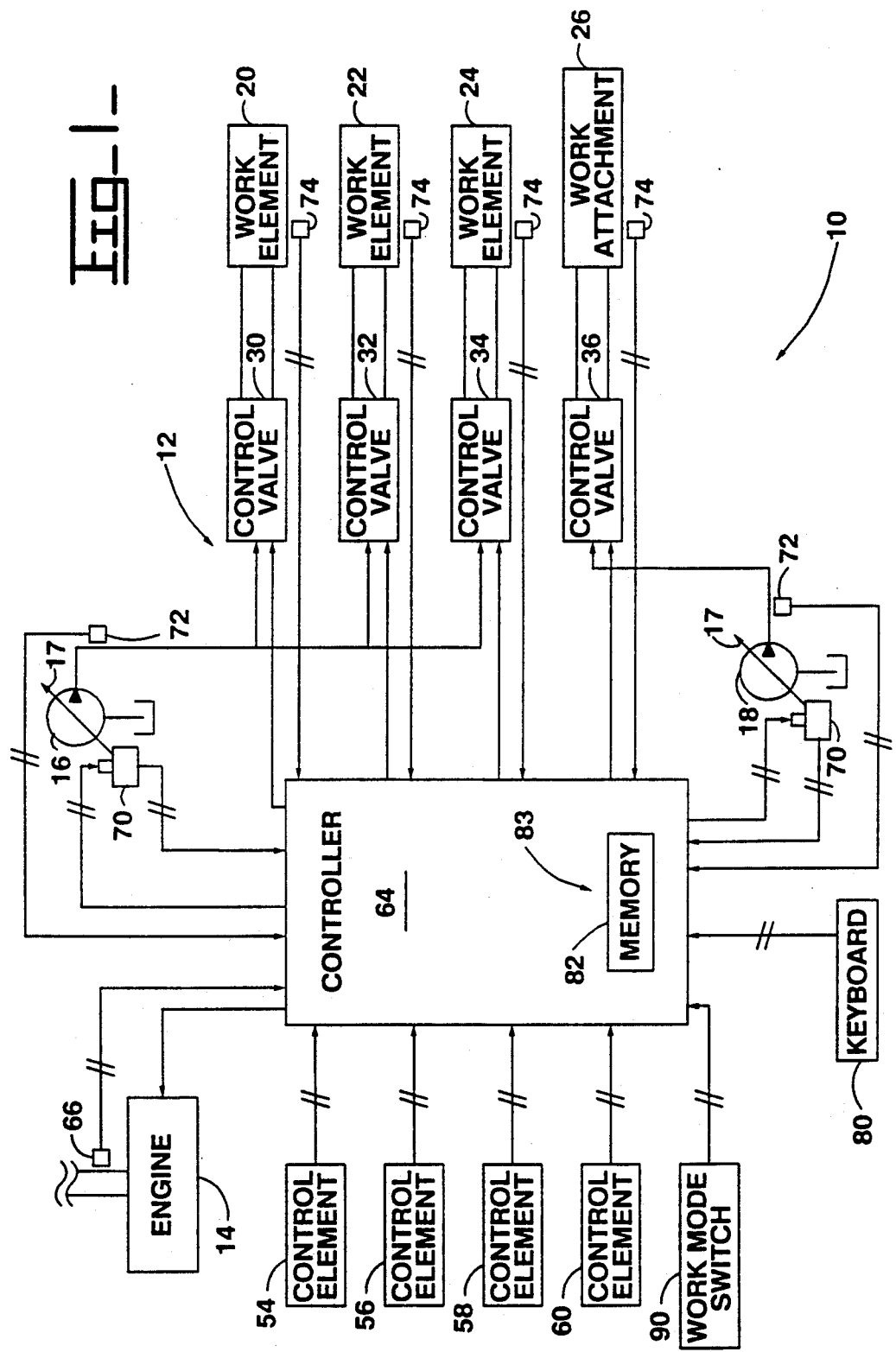

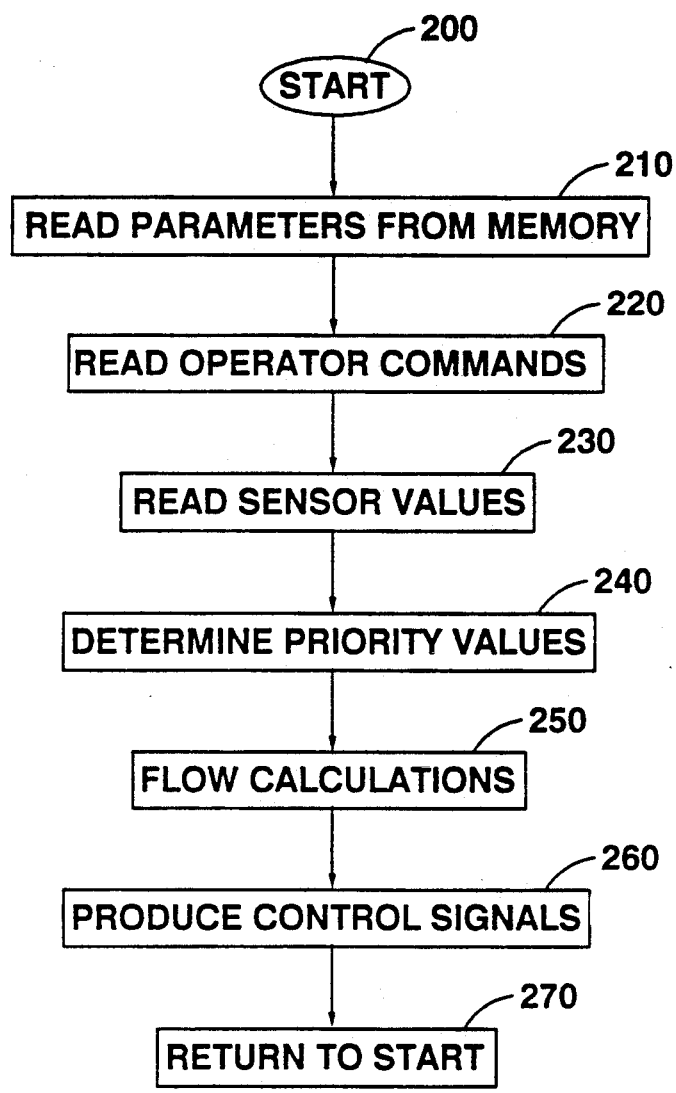
Fig_2_

CONTROL SYSTEM FOR INTEGRATING A WORK ATTACHMENT TO A WORK VEHICLE

TECHNICAL FIELD

This invention relates generally to a control system for a hydraulic work apparatus, and more particularly, to a control system for integrating the operating characteristics of a work attachment into the overall control.

BACKGROUND ART

In the operation of a fluid system serving a plurality of work elements, the work elements often demand large volumes of fluid from their associated hydraulic fluid pump. Situations arise where the work elements demand fluid at a rate greater than the capacity of the pump, thus flow limiting occurs. In such situations, one or more of the work elements, for example, demand more fluid than they are capable of receiving, while another work element requires fluid at a very high pressure in order to continue functioning under its existing load.

In a series arrangement, the "upstream" work elements receive the needed fluid first, leaving the "downstream" elements to starve. In a parallel arrangement of work elements, the fluid follows the path of least resistance. Therefore, the elements having the lowest load pressures are supplied fluid first, leaving the work elements demanding a higher load pressure with an insufficient fluid flow.

When a work attachment is added to the fluid system for a specific vehicle application, the flow demands of the work attachment may exceed the flow capacity of the pump or pumps if the hydraulic system remains in a fixed element priority, such as described above. In this state, controllably of the work elements and/or work attachment is severely limited. Attempts by the operator to adjust his inputs correctly to avoid or overcome this state often lead to poor production. In addition, automatic functions, such as an auto dig cycle for an excavator, can not be implemented on such a machine. When flow limiting occurs during an automatic function cycle, the machine stalls or incorrectly performs the function.

The present invention is directed to overcoming one or more of the problems as set forth above.

DISCLOSURE OF THE INVENTION

In accordance with an aspect of the present invention, an apparatus controls a fluid system of a work vehicle. The work vehicle has an engine and at least one fluid circuit which has a pump driven by the engine. A plurality of control valves controllably pass fluid from the pump to a plurality of respective work elements. The control valves have movable valve stems. A work attachment which has a respective control valve is added to the work vehicle. A plurality of operator control elements provide demand signals in response to selected settings. Each demand signal is indicative of a requested fluid flow to a respective work element or work attachment. A memory device stores select parameters of the fluid system. One of the select parameters is a predetermined priority value representing the precedence in which fluid is delivered from the pump to the control valve of the work attachment. A controller receives the predetermined priority value of the work attachment and the demand signals. The controller responsively determines the priority in which fluid is distributed from the pump to the respective control valves. Then the controller delivers control signals to the respective control valves in response to the determination, selectively positioning the stem of the respective control valves.

BRIEF DESCRIPTION OF THE DRAWINGS

FIG. 1 is a diagrammatic view of an embodiment of a hydraulic system of the present invention; and FIG. 2 is a flowchart depicting the algorithm used by the control system of the present invention.

BEST MODE FOR CARRYING OUT THE INVENTION

FIG. 1 illustrates an embodiment of the electrohydraulic apparatus 10. The fluid system 12 of a work vehicle, such as a hydraulic excavator or loader, includes a power source 14, commonly an engine. The engine 14 drives one or more variable displacement pumps 16 which deliver fluid through a plurality of work elements 20,22,24 connected in parallel. However, the present invention is equally suited to a plurality of work elements connected in series.

Control valves 30,32,34 are placed in the fluid path between the variable displacement pump 16 and their respective work elements 20,22,24 for controlling the fluid delivered to the work elements. Each valve includes a spool or stem for movement therein. The control valves may include closed center pressure compensated valves or open center non-pressure compensated valves.

The valves are electrically actuatable in a manner that the fluid flow is controlled by electrical signals. Pilot valves may be connected between a pilot pump and the respective control valves 30,32,34. However, the present invention is not limited to the use of pilot valves, for example, direct actuating elements may be used instead, thus replacing the pilot valves. A controller 64 delivers electrical signals to proportionally displace the valve stems, thereby regulating flow from the variable displacement pump 16 to the respective work implements 20,22,24.

Operator control elements 54,56,58 for example, electronic joysticks, are connected to the controller 64. The operator control elements provide demand signals which correspond to select settings of each respective operator control element. For instance, a potentiometer or digital encoder, delivers distinguishable signals for different settings. These demand signals, indicative of operator demand for fluid flow to the work elements, are received by the controller 64.

Additional information is provided by a speed sensing means 66, for example, a device sensitive to the movement of gear teeth on an engine, as is well known in the art. The device delivers a signal to the controller 64 representative of the actual speed of the engine.

The present invention is particularly suited for adding a work attachment to the hydraulic system 12. For example a work attachment 26, and if desirable, an associated control valve 36 may be added to the hydraulic system. Moreover a separate pump 18, which may be of the variable displacement type, may also be added. An operator control element 60 is likewise added for controlling the work attachment 26.

A swashplate angle sensing device 70 senses the angle of the swashplate 17 of the pumps 16,18. The swashplate sensing device 70 delivers an electronic signal representative of the actual swashplate angle to the controller 64. Further, a pressure device 72 senses the output pressure of each pump 16,18 and a representative signal is delivered to the controller 64. The pump pressure may be sensed electronically or mechanically as is well known in the art.

If open center non-pressure compensated valves are utilized, it may be desirable to measure the velocity of each work element to obtain operating characteristics similar to those of closed center pressure compensated valves. For example, velocity sensors 74 produce a signal representative of the movement, or more particularly, the velocity of each work element. In one embodiment, a velocity sensor 74 may include a DC generator which when rotated, generates a voltage indicative of the velocity of rotation (and thus the linear velocity of a respective work element). In a second embodiment, the velocity sensor 74 may include a position sensor. For example, a radio frequency (RF) linear position sensor. The velocity sensor 74 determines the of velocity the work element by numerically filtering and differentiating the position signal. Advantageously, the controller 64 receives the velocity signals and controls the displacement of the valves stems and pump displacements accordingly.

Advantageously, the present invention provides for the operator to change or modify select parameters within the overall control system. For example, an external I/O device 80 may be utilized by the operator to directly modify the select parameters. The I/O device 80 may include a terminal with a keyboard, for example. Typically the select parameters are found in the system memory 82 of the controller 64. Alternatively, the operator may change the parameters directly by replacing part of the system memory 82 with a memory device 83. The memory device 83 may contain predetermined parameters which correspond to the work attachment, valving, and pump. The memory 83 may be in the form of an electronic memory chip as is well known in the art.

The select parameters which may be modified include the attachment priority value, and the attachment pressure limits. The attachment priority value represents the order in which fluid is delivered from a pump 16,18 to the control valve of the work attachment. The select parameters may also include the flow characteristics of the attachment. For example, the attachment flow characteristics may include the valve spool orifice area of the attachment as a function of spool displacement. Further, the select parameters may also include the maximum pump capacity, $Q_{MAX}$, of each pump. This above listing is not exhaustive, for example other select parameters may also be modified as would be readily apparent by those skilled in the art.

The controller 64 may receive a signal representing a desired work mode from a work mode switch 90. The switch 90 preferably is in the form of a dial which has a plurality of discrete settings, each setting resulting in an electrical signal having a predetermined magnitude which corresponds to a respective work mode. Thus, when the dial is rotated an electrical signal representative of a desired work mode is generated. For instance, the switch 90 may include a potentiometer or digital convertor for producing distinguishable signals representative of desired operator settings. Here, each work mode is defined as a predetermined electrohydraulic circuit arrangement. Each predetermined hydraulic circuit arrangement is responsive to a particular task to be performed by the work vehicle. The tasks may include mass excavating, truck loading, finishing, etc.

A work mode signal is representative of a predetermined hydraulic circuit arrangement desired by the operator to perform a particular task. For example, each control valve of the hydraulic circuit may receive fluid from the pumps in an equal order (analogous to work elements connected in a parallel fashion) or the control valves may receive fluid from the pump in a distinct, separate order (analogous to work elements connected serially). Advantageously, the controller 64 determines the electrohydraulic switching of the valves to achieve a predetermined hydraulic circuit in response to receiving the work mode signal. Thus, the controller 64 determines the sequence in which the control valves receive fluid from the pump. In response to determining the sequence, the controller 64 assigns a priority value to the control valves of the predetermined hydraulic circuit. A control valve assigned with a higher priority would receive substantially all the fluid that the associated work elements demands, before any other lower priority control valve would receive any fluid. Control valves assigned with an equal priority would receive the fluid flow from the pump in the same order. Advantageously, the present invention is able determine the sequence of receivable fluid flow to the valves when multiple pumps are involved.

For example, one work mode signal may represent a loading operation. The one work mode signal corresponds to a predetermined hydraulic circuit. In response to receiving the work mode signal, the controller assigns a priority value to each of the control valves within the predetermined hydraulic circuit. The priority value represents the order or sequence in which the control valves receive fluid from the pump or pumps. In this manner, the work elements which are critical for accomplishing the associated task would receive the required fluid; thus achieving high productivity.

The controller 64 is a microprocessor based control, as is well known in the art, which utilizes programming logic for computing and decision making processes. The program may be stored in system memory 83, which may include read-only memory, random-access memory, or the like. Algorithms, important in the function of the electronic controller 64 are shown in the various flow charts.

The flowchart illustrated in FIG. 2 represents a computer software program for implementing the preferred embodiment of the present invention. The program depicted in FIG. 2 is adapted to be utilized by any suitable microprocessor.

In the block 210 the hydraulic system parameters from the system memory are read by the algorithm. As explained below, these parameters are utilized for calculations preformed by the algorithm.

In the block 220, the algorithm receives the operator command signals. For example, the algorithm may receive the demand signals representative of the requested fluid flow to be delivered to respective work elements, and the work modes signals representative of a predetermined hydraulic circuit arrangement of the hydraulic system.

The algorithm then receives the various sensor values in the block 230. The sensor values may include the actual swashplate angles, $S_{ACT}$, and pressure signals, $P_{ACT}$, for each pump, and the actual engine speed signal, $\omega$.

The algorithm continues to the block 240 to determine the sequence in which fluid is distributed from the pump to the respective control valves, including the control valve of the work attachment. Responsively, the controller 64 assigns a priority value to the associated control valves. For example, assuming a priority value for the work attachment was found in the system memory 82. The controller 64 then modifies the sequence in which the valves receive the fluid and then assigns priority values to the respective control values. Thus, work attachment is integrated into the control of the hydraulic circuit. Assuming that a work mode signal has been received, the controller 64 determines the sequence in which the control valves associated with the predetermined hydraulic circuit and the control valve of the work attachment receives the hydraulic fluid from the pump or pumps. Accordingly, the controller 64 assigns priority values to each of the valves.

In the block 250, the algorithm determines the flow rates associated with the hydraulic system. For example, the algorithm determines the total requested fluid flow, $Q_{REQ}$, through each control valve. The algorithm sums the individual requested fluid flows, represented by the demand signals, to determine the total requested fluid flow, $Q_{REQ}$. Advantageously, the algorithm compares the total requested flow, $Q_{REQ}$, with the maximum flow capacity, $Q_{MAX}$, and responsively the control signals are produced as described in the step 260.

According to the block 260, the controller 64 produces valve control signals based on the calculations preformed in the block 250. In the event where the total requested flow, $Q_{REQ}$, does not exceed the maximum flow capacity, $Q_{MAX}$, the algorithm calculates the appropriate valve areas and valve stem displacements in response to the individual requested flow signals. The controller 64 responsively delivers valve control signals to the respective control valves, displacing the valve stems to the calculated positions. However, if the calculated valve areas are such that the higher priority valve will not receive the required flow, then the valve control signals controlling the lower priority valves will be adjusted accordingly. Thus, the valve stems of the lower priority valves will displace in a manner that the associated work elements and work attachment receive less than required flow so that the higher priority valves receive the required flow.

However, if the total requested flow, $Q_{REQ}$, exceeds the maximum flow capacity, $Q_{MAX}$, the present invention advantageously utilizes the priority values to adjust fluid flow delivered to each work element and work attachment. In this manner, the priority values prevent the control valves from requesting more flow than they could receive while keeping the individual valve flow rates directly proportional to the respective demand signals. For example, the calculated valve stem displacements will be reduced proportionally to the assigned priority values. Thus, a control valve assigned with a higher priority may be have the stem displacement reduced from the calculated value proportional to the priority value. For example, a control valve assigned with a higher priority value will have the valve stem displacement reduced less than the valve stem displacement of a control valve assigned with a lower priority. In this manner, the algorithm reduces the total requested flow until it is equal to the total maximum flow, by proportionally dividing the total available flow among the control valves with respect to the priority value.

Further, the algorithm may be modified in a manner allowing the controller 64 to displace the control valves in a similar to that provided by U.S. Pat. No. 4,712,376 issued to Hadank et. al. on Dec. 15, 1987. The control disclosed in Hadank et. al. is particularly useful in conjunction with pressure compensated valves.

It may be desirable for the controller 64 to control the displacement of the pumps 16,18. For example, in the block 250 the actual flow rate, $Q_{ACT}$, of each pump is calculated by the following formula:

$$Q_{ACT} = \omega \cdot S_{ACT}$$

The controller 64 then compares the actual flow rate, $Q_{ACT}$, to the maximum flow rate, $Q_{MAX}$, and responsively produces a pump control signal adjusting the displacement of each pump 16,18 utilizing closed loop feedback control.

Further, the controller 64 may control the displacement of either pump 16,18 in response to the priority of the work attachment. Advantageously, the discharge pressure of each pump 16,18 is sensed and the pumps 16,18 may be adjusted to yield optimal control of the work attachment and/or work elements. Thus, the pumps 16,18 may be controlled to meet the flow demands of the work attachment.

INDUSTRIAL APPLICABILITY

The above described control is useful on hydraulic work vehicles possessing a plurality of work elements, such as an hydraulic excavator. Excavators are versatile work vehicles that are used in a large number of applications. When an excavator is involved in a pipe laying process, for example, hydraulic cylinder movements are slow. This type of work requires relatively low cylinder loads and precise positioning of the load, so the excavator functions exactly as the operator demands. In such situations, the pump flow capacity is not exceeded and all work elements receive the requested fluid flow.

In most applications, however, the excavator must perform quickly, possibly under high loads. One such example is the digging of virgin soil. In this situation, the stick, bucket, and boom cylinders are used concurrently throughout the majority of the dig cycle. Often, especially when a work attachment is added to the hydraulic system, the operator requests more total flow for the work cylinders than the pump is capable of providing. In a conventional machine, one or more of the work cylinders does not receive sufficient flow, due to the demand of the work attachment. As a result, the starved work cylinders discontinue to function in proportion to operator demand, causing a poorly executed function.

Conversely, the present invention avoids such work element starvation. In essence, it acts as a highly experienced operator in that it avoids flow limiting situations and maintains proportionality with the operator demands and priority of the individual work cylinders. Staying with the above mentioned soil dig example, the advantages of the present invention become evident. At some point during the dig cycle, the operator requests flow to the work attachment. Consequently, the total flow exceeds the flow level that the pump is capable of providing. Using the calculations described earlier in this specification, the controller 64 recognizes this overdemand on the pump. To prevent a flow-limiting situation from occurring, the operator inputs are "scaled down" before they reach the control valves which control fluid flow to the work cylinders. In this way, all work cylinders function in proportion to the operator demands and priority values, and the pumps never become flow-limited, thus facilitating a smoother dig cycle.

Thus, the present invention integrates the flow characteristics of a work attachment into the overall control of the fluid system, thereby providing for superior controllability of the fluid system.

Other aspects, objects, and features of the present invention can be obtained from a study of the drawings, the disclosure, and the appended claims.

We claim:

1. An apparatus for controlling a fluid system of a work vehicle having an engine, at least one fluid circuit having a pump driven by the engine, a plurality of control valves for controllably passing fluid from the pump to a plurality of respective work elements, said control valves having movable valve stems, and a plurality of operator control elements, the apparatus comprising:

a work attachment having a respective control valve, said work attachment control valve being connected to said fluid system, said work attachment being removably attached to said work vehicle and adapted to perform a specific work function;

means for providing demand signals in response to selected settings of each respective operator control elements, each demand signal being indicative of a requested fluid flow to one of a respective work element and a respective work attachment;

memory means for storing select parameters of said fluid system, one of the select parameters being a predetermined priority value representing the order in which fluid is delivered from the pump to the control valve of said work attachment;

means for providing a plurality of work mode signals, each work mode signal representing a predetermined electrohydraulic circuit arrangement associated with the control valves of the work elements;

means for receiving the work mode signal, determining the sequence in which fluid is distributed from the pump to the control valves associated with the predetermined electrohydraulic circuit arrangement in response to receiving the work mode signal, and responsively assigning a priority value to each control valve associated with the predetermined electrohydraulic circuit arrangement;

means for receiving the predetermined priority value of said work attachment, responsively redetermining the sequence in which fluid is distributed from the pump to the control valves associated with the predetermined electrohydraulic circuit arrangement, and reassigning the priority values of the control valves associated with the predetermined electrohydraulic circuit arrangement in response to the redetermined sequence; and means for receiving the demand signals, determining the total requested flow rates of the respective control valves in response to the demand signals, comparing the total requested flow rates of the respective control valves to the maximum flow capacity of the fluid system, calculating the valve stem displacements of the respective control valves in response to the demand signals, modifying the calculated valve stem displacements to limit the requested fluid flow to the lower priority control valves when the calculated valve stem displacement of the highest priority control valve yields less than the required fluid flow, delivering control signals to the respective control valves in response to the modified calculated valve stem displacements, and selectively positioning the stems of the respective control valves.

2. An apparatus, as set forth in claim 1, wherein the calculated valve stem displacements are modified proportional to the assigned priority value to limit the requested fluid flow to the respective control valves when the total requested flow exceeds the maximum flow capacity, causing the total requested flow to be reduced to the maximum flow capacity.

3. An apparatus, as set forth in claim 2, including a means for supplying information representing the selected parameters to the memory means.

4. An apparatus, as set forth in claim 1, wherein said memory means includes another select parameter which represents the maximum flow capacity of said pump.

5. An apparatus, as set forth in claim 4, wherein said control means receives the select parameters, calculates the total requested flow capacities of said pump in response to the demand signals, compares the total requested flow to the maximum flow capacity, delivers the control signals to the respective control valves in response to said comparison, selectively positions the stem of the respective valves, and limits the requested fluid flow to said respective work element and work attachment within the maximum flow capacity of said pump in response to the determined sequence.

6. An apparatus, as set forth in claim 5, wherein said pump includes a variable displacement pump and including a means for sensing the swashplate angle of said variable displacement pump and delivering a signal representative of the actual swashplate angle in response to said sensed swashplate angle.

7. An apparatus, as set forth in claim 6, including a means for sensing the engine speed of the engine and delivering a signal representative of the actual engine speed in response to said sensed speed.

8. An apparatus, as set forth in claim 7, wherein said control means receives said actual speed and swashplate angle signals, and responsively determines an actual flow rate of said pump.

9. An apparatus, as set forth in claim 8, wherein said control means compares the actual flow rate with the maximum pump displacement and alters the flow from the variable displacement pump.

10. An apparatus, as set forth in claim 9, including a means for sensing the discharge pressure of said variable displacement pump and producing a signal representative of the actual pressure in response to said sensed pressure.

11. An apparatus, as set forth in claim 10, wherein said control means receives the actual pressure signal and alters the flow of the variable displacement pump.

12. An apparatus, as set forth in claim 6, wherein said control means alters the flow from the variable displacement pump in response to priority of said work attachment.

* * * * *